United States Patent
Palmer, III

(10) Patent No.: US 9,330,300 B1
(45) Date of Patent: May 3, 2016

(54) SYSTEMS AND METHODS OF ANALYZING IMAGES

(71) Applicant: Francis R. Palmer, III, Beverly Hills, CA (US)

(72) Inventor: Francis R. Palmer, III, Beverly Hills, CA (US)

( * ) Notice: Subject to any disclaimer, the term of this patent is extended or adjusted under 35 U.S.C. 154(b) by 0 days.

(21) Appl. No.: 14/744,312

(22) Filed: Jun. 19, 2015

(51) Int. Cl.
*G06K 9/00* (2006.01)
*G06T 7/00* (2006.01)
*G06T 5/00* (2006.01)

(52) U.S. Cl.
CPC ........ *G06K 9/00281* (2013.01); *G06K 9/00261* (2013.01); *G06T 5/005* (2013.01); *G06T 7/0081* (2013.01); *G06T 2207/10004* (2013.01); *G06T 2207/20021* (2013.01); *G06T 2207/30201* (2013.01)

(58) Field of Classification Search
USPC .................................................. 382/115–118
See application file for complete search history.

(56) References Cited

U.S. PATENT DOCUMENTS

| 5,659,625 | A * | 8/1997 | Marquardt | G06K 9/00281 345/634 |
| 5,867,588 | A | 2/1999 | Marquardt | |
| 6,885,760 | B2 * | 4/2005 | Yamada | G06K 9/00228 382/117 |
| 7,369,687 | B2 * | 5/2008 | Kawato | G06K 9/00228 348/E7.08 |
| 7,436,988 | B2 | 10/2008 | Zhang et al. | |
| 7,564,990 | B2 | 7/2009 | Kern et al. | |
| 7,634,103 | B2 | 12/2009 | Rubinstenn et al. | |
| 8,194,093 | B2 | 6/2012 | Perlman et al. | |
| 8,885,873 | B2 | 11/2014 | Palmer | |
| 2003/0065255 | A1 | 4/2003 | Giacchetti et al. | |
| 2003/0065523 | A1 * | 4/2003 | Pruche | A45D 44/005 382/118 |
| 2003/0130035 | A1 | 7/2003 | Kanarat | |
| 2005/0144029 | A1 | 6/2005 | Rakowski et al. | |
| 2005/0207654 | A1 * | 9/2005 | Rodyushkin | G06K 9/6206 382/217 |
| 2005/0280809 | A1 * | 12/2005 | Hidai | G06K 9/00248 356/237.3 |
| 2007/0040907 | A1 | 2/2007 | Kern et al. | |
| 2007/0047761 | A1 * | 3/2007 | Wasilunas | A45D 44/005 382/100 |
| 2008/0004109 | A1 | 1/2008 | Kanarat | |
| 2008/0267443 | A1 | 10/2008 | Aarabi | |
| 2008/0270175 | A1 | 10/2008 | Rodriguez et al. | |
| 2009/0257654 | A1 | 10/2009 | Roizen et al. | |
| 2009/0316022 | A1 | 12/2009 | Hatano | |
| 2010/0111370 | A1 | 5/2010 | Black et al. | |
| 2011/0135205 | A1 | 6/2011 | Rhee | |
| 2013/0315475 | A1 | 11/2013 | Song et al. | |

OTHER PUBLICATIONS

Aarabi, P. et al., "The Automatic Measurement of Facial Beauty", IEEE, 2001.
Anaface—Facial Beauty Analysis—Score your face, http://www.anaface.com/.
Bass, J.W., "Beauty Can be Explained by Proportions", RealSelf, http://www.realself.com/article/beauty-explained-proportions, 2012.

(Continued)

*Primary Examiner* — Alex Liew
(74) *Attorney, Agent, or Firm* — Arent Fox LLP; J. D. Harriman

(57) ABSTRACT

Apparatuses, systems, and methods in which pixel data associated with grid sections of a gridded image can be used to analyze an attractiveness of a person represented in the image are provided. The information obtained from the analysis can be used to provide a recommendation, for example, to improve the attractiveness, and/or modify the image such that the modified image corresponds to an improved attractiveness.

20 Claims, 8 Drawing Sheets

(56) References Cited

OTHER PUBLICATIONS

Brunelli, R. et al, "Face Recognition: Features versus Templates", IEEE Transaction on Pattern Analysis and Machines Intelligence, vol. 15, No. 10, 1993.

Greyviremia, "give me lobster and Fame", blog, May 15, 2009, http://greyviremia.livejournal.com/44780.html.

"The facial proportions of beautiful people", Majorityrights.com, http://majorityrights.com/weblog/comments//the_facial_proportions_of beautiful_people.

Palmer, F., "What's Your Number", Morgan James Publishing, Chapter 4-6, 2009.

Patnaik, V.V.G. et al., "Anatomy of 'A Beautiful Face & Smile'", Journal of Anatomical Society of India, vol. 52, No. 1, pp. 74-80, 2003.

* cited by examiner

SYSTEMS AND METHODS OF ANALYZING IMAGES

FIELD OF THE INVENTION

The field of the invention is analysis of images, more specifically, analysis of images to improve attractiveness and/or provide recommendations for improving attractiveness of a person.

BACKGROUND

The background description includes information that may be useful in understanding the present invention. It is not an admission that any of the information provided herein is prior art or relevant to the presently claimed invention, or that any publication specifically or implicitly referenced is prior art.

As cosmetic surgery and other treatments, procedures and goods for improving attractiveness become increasingly popular, numerous efforts are being made to make those resources more readily available to professionals and consumers.

For example, Applicant's own U.S. Pat. No. 8,885,873 teaches systems and methods for providing an attractiveness analysis based on curvature data analyzed from an image. However, the systems and methods disclosed in the '873 Patent are best utilized by trained professionals.

This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

As another example, U.S. Patent Application Publication No. US 2011/0135205 to Rhee teaches the use of specific face points as applied to an image of a face to determine coordinate information and line data (such as ratio of distances or angles between different sets of face points), which is used to analyze the face and calculate attractiveness. In that patent application, the systems and methods fail to provide any guidance as to how one could use the attractiveness analysis to improve one's appearance.

Thus, there is still a need in the art for improved image analysis systems and methods.

SUMMARY OF THE INVENTION

The inventive subject matter provides apparatus, systems, and methods in which pixel data associated with grid sections of a gridded image can be used to analyze an attractiveness of a person represented in the image. The information obtained from the analysis can be used to provide a recommendation, for example, to improve the attractiveness, and/or to modify the image such that the modified image corresponds to an improved attractiveness.

In some preferred aspects, a gridded image (or portion(s) thereof) can be analyzed to obtain pixel data such as pixel density, pixel intensity, pixel values, pixel gradient data and/or to utilize one or more techniques (e.g. topographical grid pattern generation, image segmentation, histogram-based methods, edge detection, dual clustering techniques, etc.) to determine where certain features appear within the gridded image, and/or to determine a curvature, a volume and/or a boundary of a feature (and/or a set of features) appearing within the gridded image.

The image to be gridded could comprise an image captured by an image capture device (e.g., a color image, a black and white image, etc.). Additionally or alternatively, the image to be gridded could comprise an image that has been converted from its captured form (e.g., to a grayscale image, etc.).

Pixel data (and/or curvature data, volume data, boundary data, or any other suitable image data) obtained from the gridded image can be compared to known data associated with known gridded images and stored in a database. The known gridded images can each have a score or value assigned thereto. Where an attractiveness score or value is generated for a gridded image or portion thereof using systems or methods of the inventive subject matter, it is contemplated that the score or value could be generated in part or in whole based on a comparison of the pixel data of the gridded image to the known data stored in the database.

As used herein, "pixel data" can refer to pixel density data, pixel intensity data, pixel gradient data and/or any other information related to a pixel or set of pixels in an image. Pixel data can be used to determine, among other things, an extent to which a feature (or set of features) appears in a grid section or set of grid sections, a curvature of a feature (or set of features) appearing in a grid section or set of grid sections, a volume of a feature (or set of features) appearing in a grid section or a set of grid sections, and/or to determine a shape or relative size of a feature (or set of features).

As used herein, a reference to data stored in "a database" should be interpreted broadly to include data that is stored in multiple databases, and corresponding processors and other electronics required to store and access data in the database. Thus, reference to "known data that is stored in a database," includes known data that is stored in two or more separate and distinct organized collections of data. As used herein, a reference to an "analysis platform configured to" perform various steps should be interpreted broadly to include multiple platforms or servers configured, in combination, to perform the various steps.

One should appreciate that the disclosed subject matter provides many advantageous technical effects including the ability to obtain an attractiveness score based on applying a grid to a captured image. It should also be appreciated that the systems and methods of the inventive subject matter allows users to readily obtain recommendations on how to improve attractiveness and/or to view an image corresponding to higher attractiveness scores based on implementing one or more of the recommendations.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
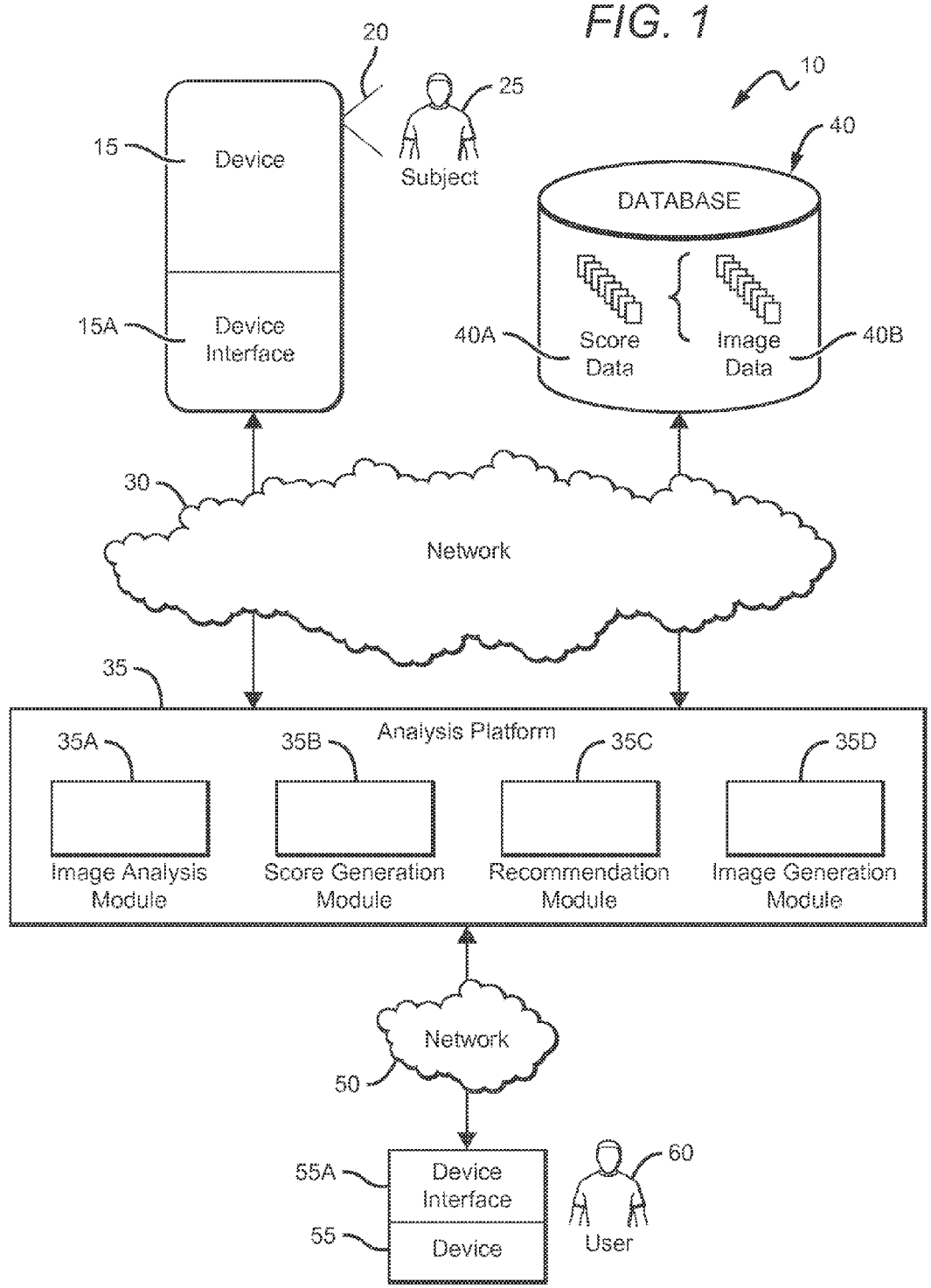
FIG. 1 is a general overview of a system of the inventive subject matter.

The inventive subject matter provides apparatus, systems, and methods in which pixel data associated with grid sections of a gridded image can be used to analyze an attractiveness of a person represented in the image. The information obtained from the analysis can be used to provide a recommendation, for example, to improve the attractiveness, and/or modify the image such that the modified image corresponds to an improved attractiveness.

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In some exemplary embodiments, methods of providing recommendations using proportional asymmetric curvature and volume analysis include the step of applying a grid to a portion of a subject, for example, the subject's face. Application of the grid to the portion of the subject could comprise an application of the grid to an image of the subject.

In another contemplated step, one or more features appearing on different portions or sides of the subject could be identified. For example, a feature could appear on the left side of the subject's face and correspond to one or more sections of the grid ("the left side feature grids" for purposes of this example), The same feature or a different feature could appear on a top portion, center portion, bottom portion or right side of the subject's face and correspond to one or more sections of the grid ("the right side feature grids" for purposes of this example). In some implementations, it is contemplated that the left side feature grids could overlap with the right side feature grids.

As used herein, the term "features" is used broadly and can include face and body parts, and even portions thereof. Some exemplary features include, a nose, a portion a nose, a nostril, a portion of a nostril, a cheek, a portion a cheek, a jaw, a portion of a jaw, an eye, a portion an eye, a forehead, a portion of a forehead, a brow-bone, a portion of a brow-bone, a temple, a portion of a temple, a bridge of a nose, a portion of a bridge of a nose, a lip, a portion of a lip, a perimeter of a face, a portion of a perimeter of the face, an ear, a portion of an ear, an arm, a portion of an arm, an elbow, a portion of an elbow, a bicep, a portion of a bicep, a tricep, a portion of a tricep, a shoulder, a portion of a shoulder, a neck, a portion of a neck, a collar, a portion of a collar, a waist, a portion of a waist, a chest, a portion of a chest, a breast, a portion of a breast, a hip, a portion of a hip, a buttock, a portion of a buttock, a thigh, a portion of a thigh, a calf muscle, a portion of a calf muscle, an ankle, a portion of an ankle, a foot, and a portion of a foot.

In another contemplated step, pixel data associated with the left side feature grids could be analyzed and compared with pixel data associated with the right side feature grids. The analysis could be useful in determining, for example, a curvature, a boundary and/or a volume of one or more features. The comparison could be useful in determining, for example, a symmetry and/or a proportionality or one or more features. The determined curvature, boundary, volume, symmetry, proportionality and/or other information could be used to determine an attractiveness score.

Additionally or alternatively, pixel data associated with one or more of the feature grids could be compared to pixel data stored in a database. The stored pixel data can advantageously be associated with attractiveness values, and an attractiveness score for the analyzed pixel data could be determined based at least in part on the comparison.

As defined above, "pixel data" can refer to pixel density data, pixel intensity data, pixel gradient data, or any other information related to a pixel or set of pixels in an image. Pixel density data can be considered data related to a determination of how many pixels having a certain characteristic (e.g., a color, an intensity, a brightness, a specific shade of gray, etc.) corresponds to a feature grid portion. Pixel intensity can be expressed within a given range between a minimum and a maximum, inclusive, for example, 0 to 255. The value assigned to each pixel could be based on any commercially suitable scale, including for example, a scale of black to white, inclusive (with, for example, 254 shades of gray) for a grayscale image.

Contemplated systems and methods could include an analysis engine configured to analyze pixel data by, for example, counting pixels that correspond to black, white, and/or various shades of gray (of equivalent comparison for color images) in a feature grid portion (and possibly even surrounding portions). The information gathered from the analysis could be used to create a 3D image of the feature or set of features included in the portion, and quantify the shape, volume and/or curvature thereof. Numerous other image analysis techniques are well known in the art and it is contemplated that any commercially suitable technique(s) could be utilized in systems and methods of the inventive subject matter.

In yet another contemplated step, one or more recommendations could be provided to a user based at least in part on the analysis, comparison and/or determination of one or more attractiveness scores. Contemplated recommendations could relate to improving an attractiveness of the subject, and can include, among other things, a product, an accessory, a style, a procedure, or a combination thereof.

In other exemplary embodiments, systems for providing recommendations relating to a measure of attractiveness are provided. Such systems include an electronic analysis platform that is functionally coupled to one or more sensors (e.g., cell phones comprising sensors) and/or databases storing images. The sensor(s) could be configured to capture images of subjects, and the analysis platform could be configured to, among other things, (1) obtain an image via a sensor and/or database, (2) apply a grid having various grid sections to the image, (3) identify one or more features of one portion of the subject corresponding to one or more grid sections ("first portion grid sections"), (4) identify one or more features of another portion of the subject corresponding to one or more grid sections ("other portion grid sections"), (5) compare pixel data of the first portion grid sections to pixel data of the other portion grid sections and/or pixel data stored in a database corresponding to one or more attractiveness scores, (6) determine an attractiveness score associated with the subject, and (7) provide a recommendation based at least in part on the comparison.

Some systems could further include one or more display or audio devices (computers, tablets, mobile phones, kiosks, etc.) to which the analysis platform could be configured to provide the recommendations. The display device that presents a recommendation could in some embodiments include a sensor that captures the analyzed image. Viewed from another perspective, it is contemplated that a subject could utilize a single device to capture an image for analysis, and to obtain a recommendation based on the analysis.

When an image is captured by a user, a system of the inventive subject matter could automatically extend the field of photo capture to extend beyond the facial or body outline of the subject such that the photo includes objects surrounding the face and/or body (e.g., hair, neck, background scenery, background people, etc) ("background imagery"). Additionally or alternatively, the user could cause the image to include background imagery. Where background imagery is included in an image, it is contemplated that the grid applied to the image could optionally extend to some or all portions of the background imagery. Analysis of grid segments applied to the background imagery could be used to determine, among other things, a location of the subject and/or a relative size of the subject.

In some exemplary systems of the inventive subject matter, information determined through an analysis of a gridded image could be used to generate a new image and/or modify an image to correspond to an improved or otherwise different attractiveness score.

The electronic analysis platform could be communicatively coupled to a database configured to store attractiveness scores corresponding to sets of image data (e.g., grid or grid section image data, grid or grid section curvature data, grid or grid section volume data, feature grid section image data, feature grid section curvature data and/or feature grid section volume data, etc.). The database could further be configured to store demographic data (or any other suitable data) that correlates to at least some of the stored attractiveness scores. Contemplated demographic data could be associated with one or more of an age, an income level, a nationality, an ethnicity and a gender.

In addition (or alternatively) to the analysis platform functions discussed above, the analysis platform could be configured to perform any combination of the following steps, which might or might not be performed in order: (1) Convert the obtained, uploaded or selected image to a grayscale image; (2) apply one or more grid sections to the image around a feature or set of features of a subject; (3) obtain a set of image data (e.g., pixel data, etc.) related to the one or more grid sections to determine a first curvature of the first feature; (4) determine a first volume of the first feature based at least in part on the first set of image data; (5) apply one or more grid sections to the image around a second feature or set of features of the subject; (6) obtain a second set of image data related to the one or more grid sections to determine a second curvature of the second feature; (7) determine a volume of the second feature based at least in part on the set of image data; (8) generate an attractiveness score based at least in part on the first and second curvatures, the first and second volumes and a query of the database; (9) modify the image to correspond to a higher attractiveness score; (10) provide a recommendation for a product or service based at least in part on the generated attractiveness score; (11) compare the first volume with the second volume to determine a ratio value; (12) compare the first curvature with the second curvature to determine a ratio value; (13) generate an attractiveness score based at least in part on one or more ratio values; (14) measure a symmetry value for the at least the portion of the subject; and (15) generate an attractiveness score based at least in part on the symmetry value.

The inventive subject matter also provides methods of improving an image and/or providing a recommendation relating to a measure of attractiveness. A first step in such methods could comprise applying a grid having at least first and second grid sections to a representation (e.g., image, video, etc.) of a subject's body portion.

The grid applied could comprise any suitable grid shape and grid section shapes. In some embodiments, the shape and/or size of the grid and/or grid sections could be selected and/or applied to the image based at least in part on a user input. The information input can be related to, among other things, a gender, a description of a shape (oval, round, triangular, square, curvy, athletic, etc.), an ethnicity and/or any other suitable information. Additionally or alternatively, the selection and/or application of a grid to the image could be based at least in part on one or more anchoring points and/or anchoring formulas.

In another contemplated step, a set of pixel data associated with a first feature (or set of features) of the body portion (e.g., a check of a face, etc.) could be derived from the application of the grid. The set of pixel data could be compared to two or more known sets of pixel data stored in a database as described above to determine one or more attractiveness scores. Preferably, the known sets of pixel data include at least a first set associated with a first value or score, and a second set associated with a second value or score.

The attractiveness score(s) can be based on several factors relating to the application of the grid, including for example, an extent to which the grid needs to be manipulated or modified from a baseline grid, a shape of the grid, and/or a size of the grid. The attractiveness score(s) can additionally or alternatively be based on several factors unrelated to a grid shape or size, including for example, a curvature or volume of one or more features as determined based on image (e.g., pixel, etc.) data. In some aspects, an attractiveness score can include a feature score associated with a size, proportionality, curvature and/or volume of a feature (or set of features).

A second set of pixel data associated with a second feature (or set of features) of the body portion could be derived from the application of the grid. The second set of pixel data could be compared to two or more known sets of pixel data to determine one or more attractiveness scores associated with the second feature or set of features. In some contemplated methods, the comparison of first and second sets of pixel data with known sets of pixel data could be used to determine a single attractiveness score.

The known sets of pixel data compared to the first set of pixel data could be the same as, but is more likely different from, the known sets of pixel data compared with the second set of pixel data. Each set of the known sets of pixel data compared to the first set of pixel data can be associated with a different value or score. Each set of the known sets of pixel data compared to the second set of pixel data can similarly be associated with a different value or score. Alternatively, some sets of the known sets of pixel data compared to the first set of pixel data can be associated with the same value or score and/or some sets of the known sets of pixel data compared to the second set of pixel data can be associated with the same value or score.

Based at least in part on one or more attractiveness scores associated with the captured, uploaded or selected image, a recommendation for a product and/or a service can be provided. Additionally or alternatively, an image can be generated that corresponds to a different (e.g., higher, lower) attractiveness score based on the captured, uploaded or selected image, the one or more attractiveness scores and/or the recommendation(s), if any. The generated image could be based at least in part on a beauty product, an application of a product, a surgical procedure and/or a style.

In yet other exemplary embodiments, systems for improving an image are provided. Contemplated systems can include an electronic analysis platform functionally coupled to a sensor that captures an image of a face, a body, or combination or portions thereof. Additionally, the electronic platform could be communicatively coupled to a database configured to store attractiveness scores associated with corresponding grid sections, curvature data and/or volume data.

The analysis platform could be configured to obtain an image via the sensor, and apply a grid having one or more feature grid sections to the image (or an image derived from the image, for example, a grayscale version of the image). The analysis platform could additionally or alternatively derive a set of pixel data from applying the first feature grid sections over a first feature represented in the image. The set of pixel data could be compared with known sets of pixel data stored in the database, each of which can be associated with a different known value or score.

Upon comparing the pixel data sets, the analysis platform could derive a first attractiveness score based at least in part on the comparison. Additionally, the analysis platform could be configured to modify the image and/or generate a new image that corresponds to a higher attractiveness score. For example, the analysis platform could be configured to receive a user input related to a desired attractiveness score, and the analysis platform could modify the first feature in the image to correspond to the desired attractiveness score based on the attractiveness scores and corresponding data stored in the database.

Additionally or alternatively, the analysis platform could be configured to provide a recommendation for at least one of a beauty product, an application of a product, and a procedure based at least in part on at least one of the first set of pixel data and the first attractiveness score.

FIG. 1 illustrates an overview of some contemplated systems of the inventive subject matter. Ecosystem 10 includes an analysis platform 35 that is functionally coupled to device 15 and database 40 over network 30, and device 55 over network 50. It should be appreciated that "network 30" could comprise a single network, or two or more separate networks.

Analysis platform 35 is configured to receive an image of a subject 25 captured by sensor 20 of device 15 via device interface 15A, and over network 30. Once obtained, image analysis module 35A could optionally convert the image into a grayscale or other image. In other contemplated embodiments, the image could comprise an unconverted image and/or the image received by the analysis platform 35 could be a previously converted image, for example, an image converted by an external server.

Image analysis module 35A could additionally or alternatively be configured to enable application of one or more grids to the image based at least in part on an input of the subject 25 and/or user 60 and/or based on one or more anchoring formulas and/or algorithms. Where the analysis platform is embodied in a mobile phone or tablet application, for example, a user could utilize a front-facing or rear-facing camera to align a portion of the subject to a representation of a grid appearing on the phone or tablet screen. Additionally or alternatively, a user could upload an image or select an image from an image database or library and cause a grid to be applied to the image or portion thereof.

Image analysis module 35A (or another module) could be configured to obtain one or more sets of image data related to different grid sections or feature grid portions that correspond to one or more features of the subject 25. This image data could be used to determine the curvatures and/or volumes of the different features, and/or could be compared to information stored in a database and/or to one another. The results of using or comparing the image data could be used by the score generation module 35B in generating an attractiveness score.

For example, the score generation module 35B could use image data, curvature data and/or volume data obtained from the gridded image and related to the subject, and query database 40, which stores a plurality of scores 40A and corresponding image data, curvature data and/or volume data 40B. Based on, for example, determining which score(s) from the stored set of scores 40A correspond to image data, curvature data and/or volume data 40B that best match the data from the received image, an attractiveness score can be determined.

Analysis platform 35 could additionally be configured to display or otherwise notify a user 60 of the generated attractiveness score, for example, via a display and/or speaker of device 55. Upon receiving notification of the generated score, user 60 could use device interface 55A to enter a request to view a modified and/or new image, and/or obtain a recommendation based at least in part on an improved attractiveness score.

Upon receiving user 60's input (or automatically in some embodiments), the recommendation module 35C could provide a recommendation to improve the attractiveness score on the display of device 55 (or any other device(s)). Where user inputs are received by the analysis platform 35, the recommendations could be provided and/or generated based in part on the user inputs.

Contemplated recommendations include, among other things, recommendations for a beauty product (e.g., a cosmetic product, a hair accessory, a clothing accessory, etc.), an application of a product, and/or a procedure (e.g., an injection, an eyelift, an implant, a chin tuck, etc.). In some embodiments, the recommendations could appear in text or graphics appearing over the analyzed image.

Additionally or alternatively, the image generation module 35D could generate an image corresponding to an improved attractiveness score, or various improved attractiveness scores (e.g., an image corresponding to a score of 75, a second image corresponding to a score of 80, and a third image corresponding to a score of 95, etc.) automatically and/or based on a user input. In some aspects, the generated image could include representations of multiple possible modifications to one or more features that correspond to various attractiveness scores and/or recommendations. Where user inputs are received by the analysis platform 35, the modified and/or new images could be provided and/or generated based in part on the user inputs.

The improved image(s) could be a modification of only the features analyzed, only a subset of the features analyzed, a modification to all features represented in an image, and/or a modification to a subset of all features represented in an image. Similarly, the recommendation(s) could be a recommendation related to only the features analyzed, only a subset of the features analyzed, a recommendation related to all features represented in an image, and/or a recommendation related to a subset of all features represented in the image.

It is contemplated that a combination of a recommendation and an improved image corresponding to the recommendation could be provided to assist a user in determining whether a particular product or procedure should be utilized.

Figure 2:
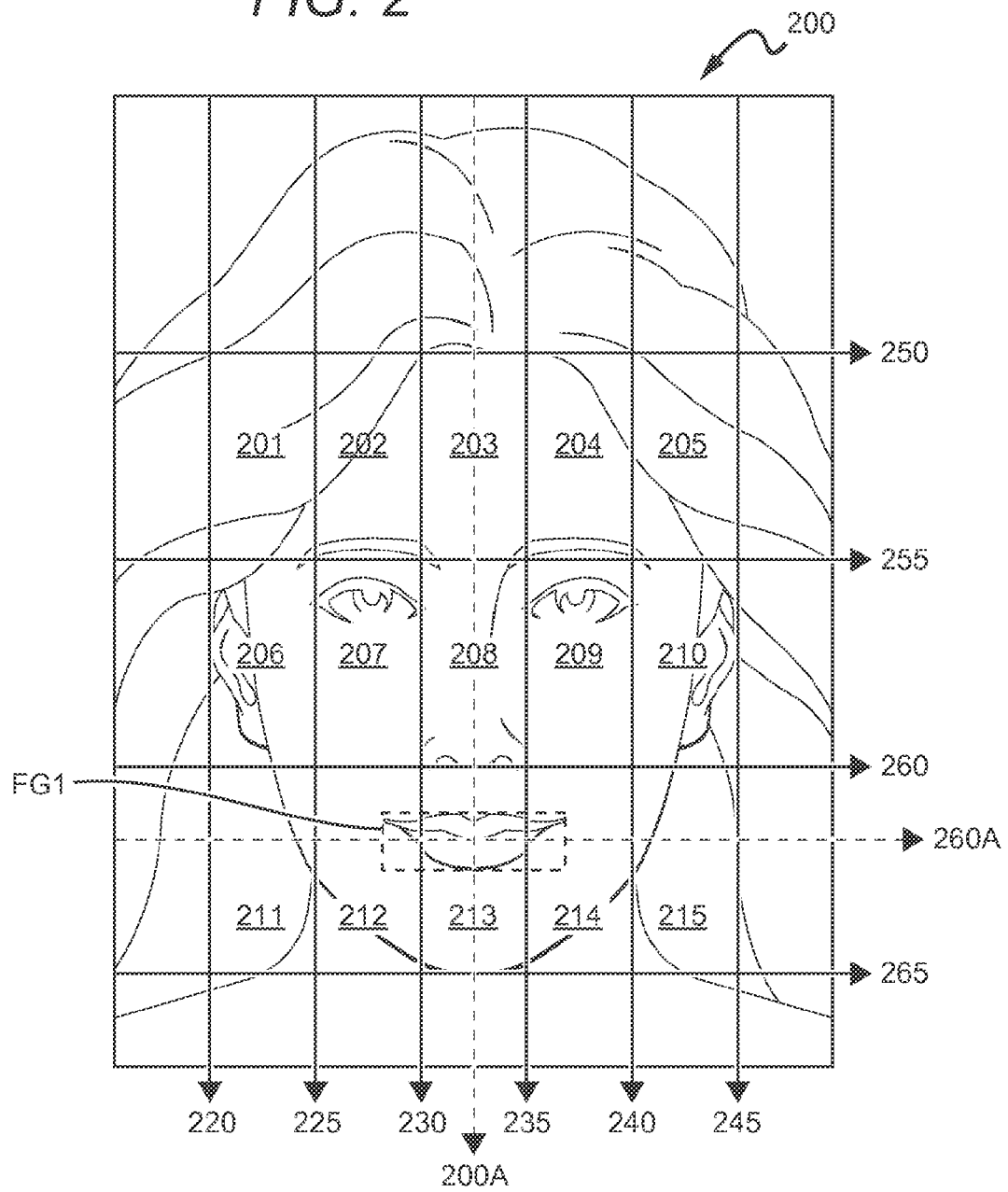
FIG. 2 illustrates a gridded image of a representation of a female face, which could be generated using systems and method of the inventive subject matter.

FIG. 2 illustrates an exemplary gridded image according to various aspects of the inventive subject matter including a representation of a female subject. As illustrated, gridded image 200 includes a grid applied to an image of a female subject's face, and the grid comprises and/or consists of substantially vertical and substantially horizontal lines. As used herein, the term "substantially vertical" means exactly vertical or within 10 degrees of vertical. As used herein, the term "substantially horizontal" means exactly horizontal or within 10 degrees of horizontal.

The grid included in gridded image 200 divides the imaged face into a 5×3 grid comprising 15 grid sections 201-215, each grid section (201-215) having the same area and perimeter. Grid sections 201-215 extend horizontally from the edge of the female's left ear to the edge of the female's right ear, and vertically from the edge of the female's hairline to the bottom of the female's chin.

Where the user is utilizing a computer application embodying components of the inventive subject matter, it is contemplated that the user can utilize a user interface to select or enter a gender, culture, facial shape (e.g., round, oval, heart-shaped, square, rectangular, triangular, egg-shaped, etc.), body shape (e.g., athletic, hourglass, pear-shaped, etc.), demographic data, and/or any other identifying information.

The baseline grid selected for application from a database could be selected based at least in part on the information provided by the user. In some embodiments, it is contemplated that some or all of the baseline grids stored in the database could be associated with a minimum score, a maximum score, demographic data, shape data, age data and/or any other suitable information. For example, a baseline grid for an hourglass body shape could have a minimum score of 30 and/or maximum score of 100, while a baseline grid for a mid-section dominant body shape could have a minimum score of 20 and/or maximum score of 80. Additionally or alternatively, it is contemplated that some or all of the baseline grids stored in the database could be associated with no score or the same scores.

Alternatively, it is contemplated that a single grid could serve as the baseline grid for a given feature, set of features and/or portion (e.g., a single grid applied to all face images, a single grid applied to all body images, a single grid applied to all face and body images, etc.).

In some embodiments, the user could adjust some or all of the grid lines to align with specific points or features in the image. For example, a user could align a grid appearing on the user device such that lines 220 and 245 align with the outer edges of the user's ears. This can be achieved by moving the camera sensor closer to, or further away, from the subject's face. Additionally or alternatively, this can be achieved by utilizing a zoom function. In some embodiments, the user could further segment the grid sections into sub-sections (e.g., into quarters, into thirds, into halves, etc.).

If grid lines 250 and 265 do not align with the subject's forehead top and chin bottom when lines 220 and 245 are aligned as set forth above, it is contemplated that the user could move lines 250 and/or 265 such that they align with the forehead top and chin bottom, respectively. In some embodiments, lines 250 and/or 265 could automatically adjust to align with the desired points of the imaged subject. Such adjustments could affect the attractiveness score(s) generated by an analysis platform.

While the above description focuses on utilizing the outer edges of the user's ears, it is contemplated that any suitable anchoring points and/or formulas could be used to determine grid placement. For example, some or all of the following anchoring points may be suitable for grid lines and grids:

Line 225 is aligned with the outer edge of the subject's right eye.
Line 240 is aligned with the outer edge of the subject's left eye.
Line 230 is aligned with the right edge of the subject's nose.
Line 235 is aligned with the left edge of the subject's nose.
Line 200A is aligned with the midline of the subject's nose (equidistant between lines 230 and 235).
Line 255 is aligned with the glabellar area of the subject's face.
Line 260 is aligned with the columellar base of the subject's face.
Line 260A is aligned with the point that the subject's upper and lower lips meet along line 200A.

It should be appreciated that anchoring formulas and anchoring points used could affect an attractiveness score. As one contemplated example, a system or method of the inventive subject matter may utilize two anchoring points for facial images positioned at the outer edge of the subject's left eye and the outer edge of the subject's right eye. Additionally or alternatively, the system or method may utilize an anchoring formula that requires (1) vertical lines to be placed at the two anchoring points, (2) two additional vertical lines evenly spaced and positioned between the two anchoring point lines, (3) two vertical lines evenly spaced and positioned on opposite sides of the anchoring point lines, and (4) four evenly spaced horizontal lines spanning the top of the subject's forehead to the bottom of the subject's chin.

If one or more of the grid lines need to be adjusted to align with one or more specified anchoring points (e.g., the edge of the subject's nose, the bottom of the subject's nose, etc.), it is contemplated that the adjustments could cause a corresponding adjustment to the subject's attractiveness score, for example, based on a formula.

The above description of grid line placement is only included to provide some examples. The ideal placement of grid lines could be different from those set forth above, and could be determined based on any suitable algorithms, specified anchoring point(s) and/or formulas.

An analysis platform of the inventive subject matter could additionally be configured to apply and/or generate a feature grid portion within gridded image 200 for comparing with (1) other features of the subject's face, and/or (2) feature grid portion data stored in a database (e.g., portions that include other imaged lips and corresponding pixel data, curvature data, volume data and/or attractiveness scores, etc.). As shown, FG1 is a feature grid portion that could be generated by an analysis platform of the inventive subject matter, and that corresponds to the subject's lips. Alternatively or additionally, a lip feature grid portion could comprise grid sections 212, 213 and 214 and/or any other suitable grid sections or sub-sections.

A feature grid portion could be generated based on, among other things, an identification of a specific feature's boundary, a formula that specifies what grid sections or portions thereof are to be treated as a feature's grid portion and/or any other suitable information. While not intended to be limiting to the inventive subject matter, the following is a list of some contemplated feature grid portions of gridded image 200, which could be generated based on any suitable methods, including the techniques and methods described below.

Right cheek grid portion could comprise lower $2/3$ sub-sections of grid section 207 and the lower $2/3$ of the adjacent $1/3$ sub-section of grid section 206. Alternatively right cheek grid portion could comprise grid sections 206 and 207.

Left cheek grid portion could comprise lower $2/3$ sub-sections of grid section 209 and the lower $2/3$ of the adjacent $1/3$ sub-section of grid section 210. Alternatively right cheek grid portion could comprise grid sections 209 and 210.

Lip grid portion could comprise FG1 as described above, or could comprise, for example, the upper $1/2$ sub-section of grid section 213 and the upper $1/2$ portion of the adjacent $1/3$ sub-section of each of grid sections 212 and 214.

Upper lip grid portion could comprise the upper $1/3$ of the lip grid portion, and lower lip grid portion could comprise the lower $2/3$ of the lip grid portion.

Chin grid portion could comprise the lower half of grid section 213. Alternatively chin grid portion could comprise grid section 213 or a combination of grid sections 212-214.

Left and right eyebrow grid portions could comprise a combination of grid sections 204 and 202. Alternatively, eyebrow grid portion could comprise the lower ¼ sub-section of each of grid sections 202 and 204.

Left and right eyelid grid portions could comprise the upper ½ sub-section of each of grid sections 209 and 207.

Left and right upper eyelid grid portions could comprise the upper ½ portion of the eyelid grid portions. It is contemplated that the inter-pupillary line could be the midpoint.

Left and right lower eyelid grid portions could comprise the lower V2 portion of the eyelid grid portions. It is contemplated that the inter-pupillary line could be the midpoint.

Nose grid portion could comprise grid section 208.

Left and right male jaw grid portions could comprise grid sections 214-215 and 211-212, respectively.

Left and right female jaw grid portions could comprise grid sections 212 and 214.

Skin grid portion could comprise grid sections 201-215 and the 7 lowermost grid sections in gridded image 200.

Neck grid portion could comprise the 5 lowermost grid sections beneath grid sections 211-215.

Hair grid portion could comprise all the uppermost grid sections in gridded image 200.

One or more of various image processing methods and techniques could be utilized to determine, identify and/or generate feature grid portions, including for example, pixel data analysis techniques (e.g., measuring pixel intensity and generating feature grid portions around regions enclosed by pixels having higher intensity, mapping the pixel intensity, density, etc. to create a gradient map based on pixel intensity and/or density—the map showing the relative shape and volume of a feature, etc.) and/or one or more of the following image segmentation techniques:

Topographical grid pattern or virtual model generation techniques: An example of a generated topographical grid pattern can be seen in three dimensional ultrasound scans. It is contemplated that similar 3D topographical grid patterns and/or virtual models could be generated based on a two dimensional image using known techniques, for example, the Rhinoceros (Rhino™) interface or SketchUp™. Such topographical grid pattern or virtual model could be beneficial in enabling a user (or analysis platform) to visualize the curvatures, volumes, shapes, sizes and/or boundaries of features. Additionally or alternatively, the topographical grid pattern or virtual model could be compared to known virtual models stored in a database and associated with attractiveness scores, and/or could be useful in determining the boundaries of a feature grid portion and/or generating feature grid portions.

Image Recognition Techniques: Known image recognition techniques such as those embodied in facial recognition software could be useful for similar purposes as topographical generation techniques described above. For example, Face-Mark, an API that detects features in an imaged face, could be used to assist in generating a feature grid portion. Additionally or alternatively, image recognition techniques could be utilized to determine demographic information or shape information related to a subject such that a user input would not be necessary for utilizing such information, for example, to determine a baseline grid to be applied.

Image Segmentation Techniques: In computer vision, image segmentation involves partitioning a digital image into sets of pixels in order to simplify and/or change the image into something that could more easily be analyzed. For example, labels could be assigned to the pixels in an image such that pixels with the same label share certain characteristics (e.g., pixel color, intensity, etc.). The result of image segmentation could be a set of segments that collectively cover the entire image of portion thereof. These segments could comprise feature grid portions. Additionally or alternatively, the information obtained via image segmentation could be used to locate objects and boundaries in images, which could be useful in generating feature grid portions that correspond to one or more features in an image of a subject.

Histogram-based methods: Histogram-based methods are a type of image segmentation method that computes a histogram from the pixels in an image. The peaks and valleys in the histogram can be used to locate clusters in the image, for example, based on color or intensity measurements. It is contemplated that these histograms and information obtained there-from could be useful in determining the boundaries of feature grid portions.

Edge Detection Techniques: It is contemplated that edge detection techniques could be used to identify and/or generate feature grid portions in some embodiments as there is often a sharp adjustment in intensity at both region boundaries and edges.

Dual Clustering Method: Another method that could be useful in identifying or generating feature grid portions is the dual clustering method. Using the dual clustering method, partitioning an image based on histogram analysis is checked by high compactness of the clusters and high gradients of their borders.

The image data (or other data, for example, curvature data determined based on the image data) associated with a feature grid portions could be compared to image data of other feature grid portions appearing in a gridded image and/or image data associated with known feature grid portions and stored in a database (e.g., attractiveness scores, pixel data, curvature data, etc. associated with the known feature grid portions). The results of such comparisons could be used to contribute to determining an attractiveness score.

While the grid illustrated in FIG. 2 is shown as described above, it should be appreciated that contemplated grids could include grid sections having any suitable shape. It should also be appreciated that some or all of the grid sections and/or feature grid portions being analyzed can have the same or different shapes, areas and/or perimeters.

The analysis platform could further be configured to evaluate the pixel data within a gridded image to generate a feature grid portion, a portion of a feature grid portion and/or a combination of feature grid portions.

Additionally or alternatively, the analysis platform could be configured to evaluate the pixel data within a feature grid portion, a portion of a feature grid portion and/or a combination of feature grid portions. The results of the evaluation could be used to, for example, provide an attractiveness score.

Pixel data can be evaluated and analyzed using any commercially suitable method(s) that quantify the amount or degree of pixel density, pixel intensity, pixel coloring, pixel darkness and/or any other suitable pixel-related or image-related information.

Analysis of pixel data could be used to, among other things, create a topographical three-dimensional image of a feature, combination of features, face, body, and/or combinations thereof to assist in determining a shape, boundary information, a volume, a proportional volume (e.g., of left and right side features, of a feature compared to a different feature, etc.) and/or curvatures.

Viewed from another perspective, a pixel map or gradient illustrating the number of different pixel types (e.g., darker pixels, lighter pixels, pixels of a certain color, pixels of a certain intensity, etc.) per area could be used to create or determine a shape, a contour, a volume or other information related to a feature or set of features within a gridded image or portion thereof.

The analysis platform could use the information gathered from the analysis of pixel data to, among other things, quantify and generate an attractiveness rating (also referred to as a "beauty number" herein). For example, the pixel data and/or the pixel map/gradient could be compared to a finite number of known sets of pixel data and/or pixel maps/gradients having associated attractiveness scores. The generated beauty number could be associated with a general attractiveness, an attractiveness of a feature and/or an attractiveness of a set of features.

Upon generating one or more beauty numbers, the analysis platform could provide one or more recommendations or lists of goods, products, providers, and/or services (e.g., professional services such as aesthetic medical surgery, facials, etc.) that could be used to improve the beauty number, for example, to align more closely with an aesthetic beauty ideal.

The recommendation could be visual and/or auditory. As a few examples, the recommendation could be presented through the speaker of a computing device, could be displayed over the subject's image (e.g., the gridded image, etc.) as an augmented reality overlay, or as text, images, menus and/or drop-down menus overlying the subject's image or separate from the subject's image.

Additionally or alternatively, the analysis platform could use the information gathered from the analysis of pixel data to, among other things, modify the subject's image and/or generate a new image that improves one or more features to more closely align with an improved shape, volume and/or size as identified via a comparison with information stored in the database. This modification or generation of a new image could be automatic and in accordance with a pre-set percentage increase (e.g., 10%, 20%, 25%, 50%, 75% improvement, etc.). The modification could additionally or alternatively be based on one or more user selections or input regarding the degree of improvement, the features selected for improvement, the recommendations the user would like to see a visualization of, or any other user selections or input.

Figure 3A:
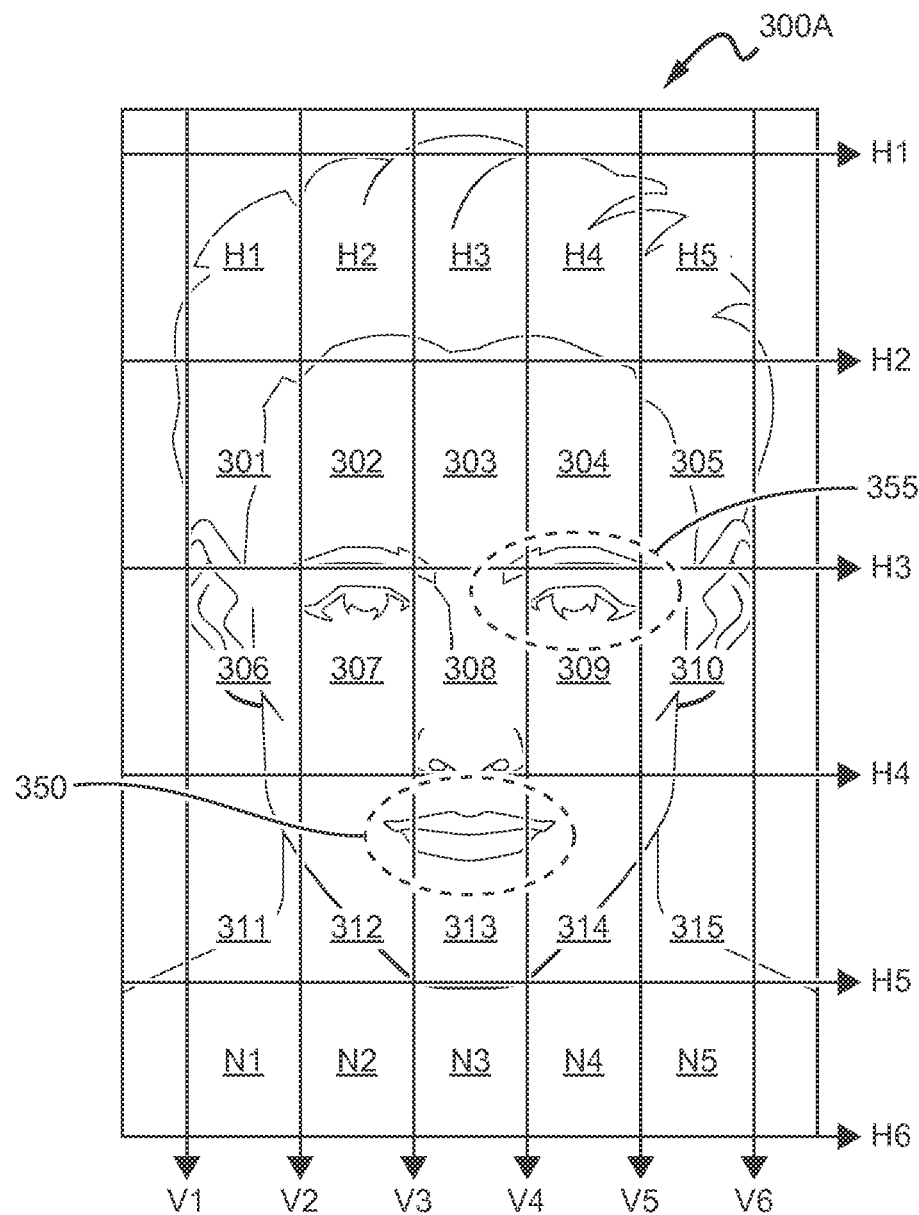
FIGS. 3A-3B illustrate a grid applied to an image of a male face, in frontal and profile views.
Figure 3B:
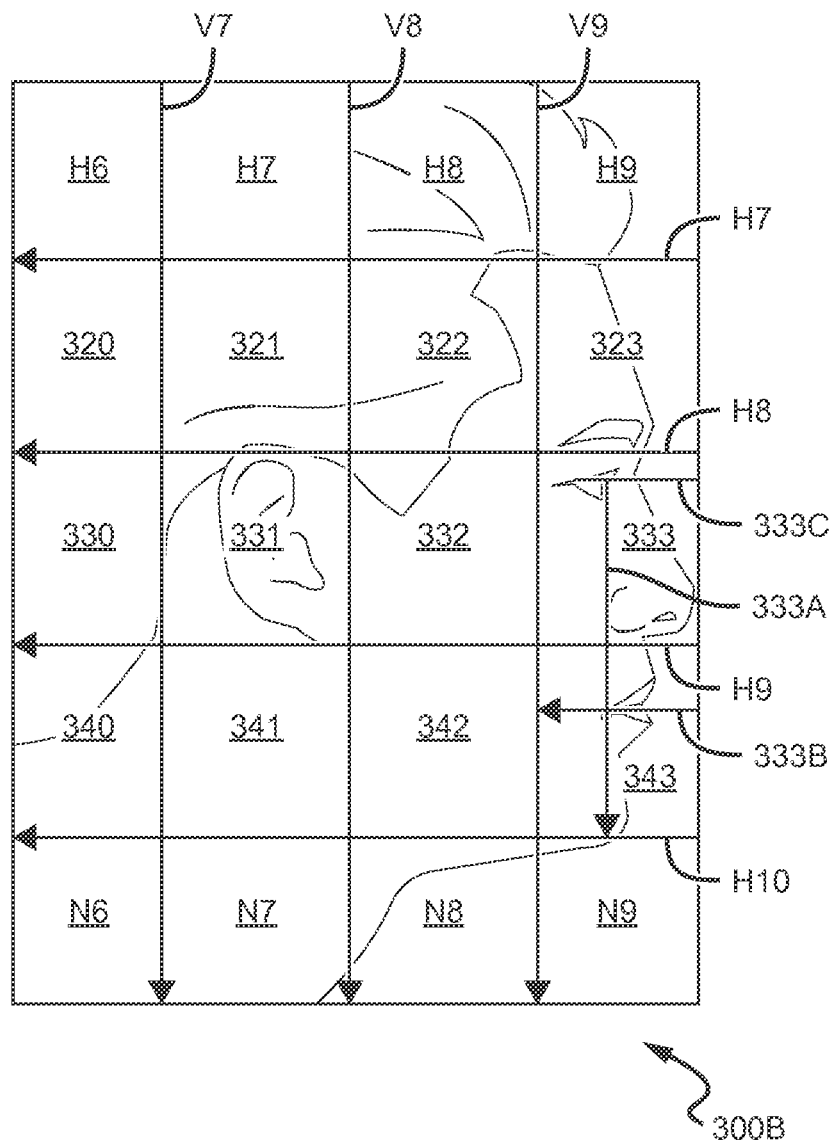

FIGS. 3A-3B illustrate a grid applied to a male face in frontal and profile views. FIG. 3A shows gridded image 300A, which includes a frontal representation of a male subject's face and a grid applied to the imaged face, hair and neck of the subject. The grid includes H1, H2, H3, H4 and H4 extending across the top of the image, grid sections 301, 302, 303, 304 and 305 extending vertically from the top of the subject's forehead to below the subject's brow-bone, grid sections 306, 307, 308, 309 and 310 extending vertically from below the subject's brow-bone to beneath the subject's nostrils, grid sections 311, 312, 313, 314 and 315 extending vertically from beneath the subject's nostrils to the bottom of the subject's chin, and grid sections N1, N2, N3, N4 and N5 extending from the bottom of the subject's chin and over the subject's neck area.

Vertical lines V1, V2, V3, V4, V5 and V6 are evenly-spaced and extend from outer ear-to-outer ear. Horizontal lines H1, H2, H3, H4 and H5 are evenly-spaced and extend from the top of the subject's hair to the bottom of the subject's chin. Horizontal line H6 extends across the bottom of the image.

Gridded image 300A illustrates what may be visible to a user of systems and methods of the inventive subject matter after at least some analysis is completed by an analysis engine. Lip grid portion 350 and left eyebrow/eye grid portion 355 are visibly identified, and a drop down menu for recommendations 350A is being presented to the user. Once the user selects a recommendation, it is contemplated that the analysis platform could generate an improved image incorporating the goods or services from the recommendation.

FIG. 3B shows gridded image 300B including a representation of the male subject's face profile, and a grid applied to the imaged face. The grid includes H6, H7, H8 and H9 extending across the top of the image, grid sections 320, 321, 322 and 323 extending vertically from the top of the subject's forehead to below the subject's brow-bone, grid sections 330, 331, 332 and 333 extending vertically from below the subject's brow-bone to beneath the subject's nostrils, grid sections 340, 341, 342 and 343 extending vertically from beneath the subject's nostrils to the bottom of the subject's chin, and grid sections N6, N7, N8 and N9 extending from the bottom of the subject's chin and over the subject's neck area.

Vertical lines e.g., V7, V8 and V9 are evenly-spaced, and extend from the back of the subject's head to the forward most (front) portion of the nasal tip. Horizontal lines e.g., H7, H8, H9 and H10 are evenly-spaced and extend from the top of the subject's hair to the bottom of the subject's chin.

Where the user is utilizing a computer application embodying components of the inventive subject matter, it is contemplated that the user can utilize a user interface to select and/or capture an image and cause a gridded image to be generated and analyzed in a manner similar to what was described above in connection with FIG. 2.

For example, a user can upload an image, select an image to be analyzed and/or capture a profile image of a subject using a camera-enabled device. The user could then cause a grid to be placed on the image by lining up certain anchoring points on the image with lines of the grid, and resize the grid as appropriate or desired.

While any suitable anchoring points are contemplated, the following are some examples of anchoring points that could be utilized: The right side of the grid could be aligned with the subject's nasal tip; line H8 could be aligned with the bottom of the subject's brow-bone or eyebrows; line H9 could be aligned with the base of the subject's nose; line V8 could be aligned with the front of the subject's ear; line 333A, the medial canthal line, could be aligned with the subject's medial canthus and extend from line 333C to line H10; line 333B, the oral commissure line, could be aligned with the point where the upper and lower lips meet and extend between the right side of the grid and line V9; and/or line 333C, the interpupillary line, could extend from the right side of the grid up to the subject's pupil or line V9.

Based on the placement of one or more lines in accordance with an anchoring point or formula, the remaining grid lines could be generated, moved, resized and/or modified.

A feature grid portion could be generated based on, among other things, an identification of a specific feature's boundary, a formula that specifies what grid sections or portions thereof are to be treated as a feature's grid portion and/or any other suitable information. While not intended to be limiting, the following is a list of some contemplated feature grid portions of gridded image 300B (with similar feature grid portions contemplated for gridded image 4B).

Right cheek grid portion could comprise the area comprised by lower ⅔'s of 332 plus adjacent lower ⅔'s portion of 333 that is behind (posterior to) line 333A.

Lip grid portion could comprise upper ½ of 343 contained within the front most vertical line and line 333A.

Upper lip grid portion could comprise the portion of the lip grid that is above line 333B.

Chin grid portion could comprise the lower ½ of 343.

Right eyebrow grid portion could comprise the lower ⅓ of 323.

Right eyelid grid portion could comprise the upper ⅓ of 333.

Nose grid portion could comprise area of 333 contained within the boundaries of lines 333C, 333A and H9.

Jaw grid portion could comprise 341-342.

Skin grid portion could comprise any portion of grid sections 322, 323, 331-343 and/or N6-N9.

Neck grid portion could comprise N6-N9.

Hair grid portion could comprise any portion of grid sections 320-322, 330, 340 and/or H6-H9.

Figure 4A:
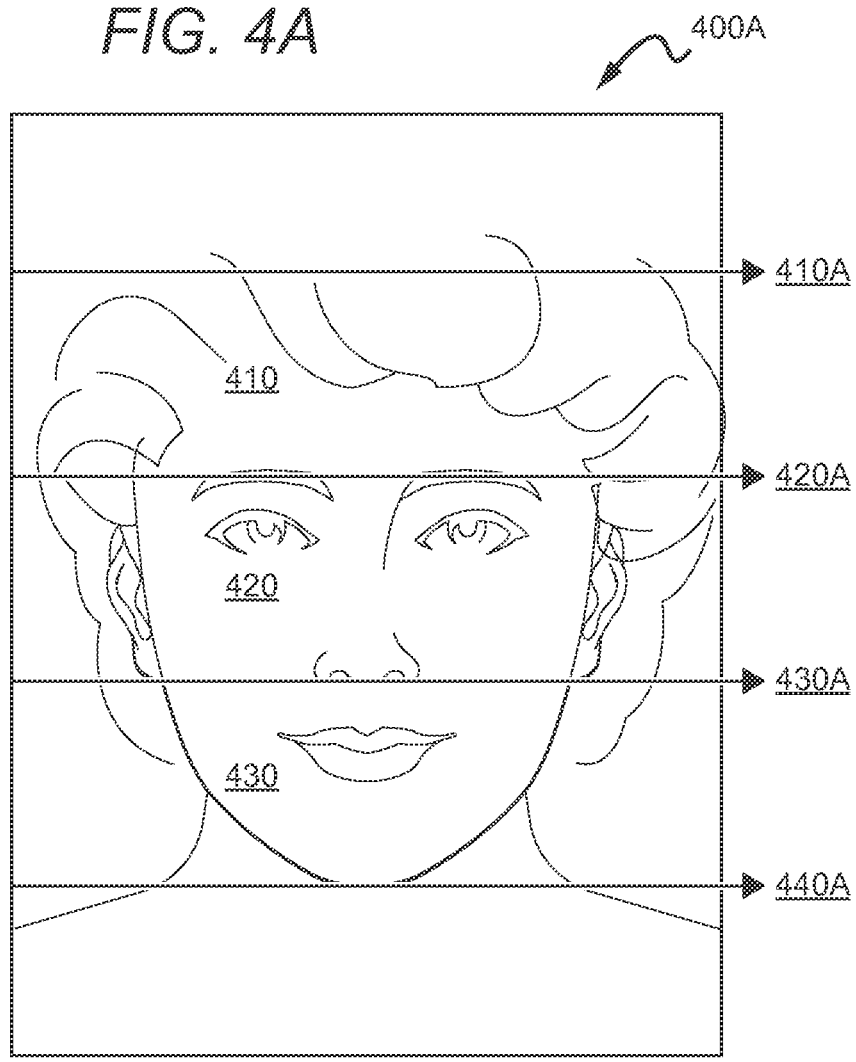
FIGS. 4A-4B illustrate a grid applied to an image of a female face, in frontal and profile views.
Figure 4B:
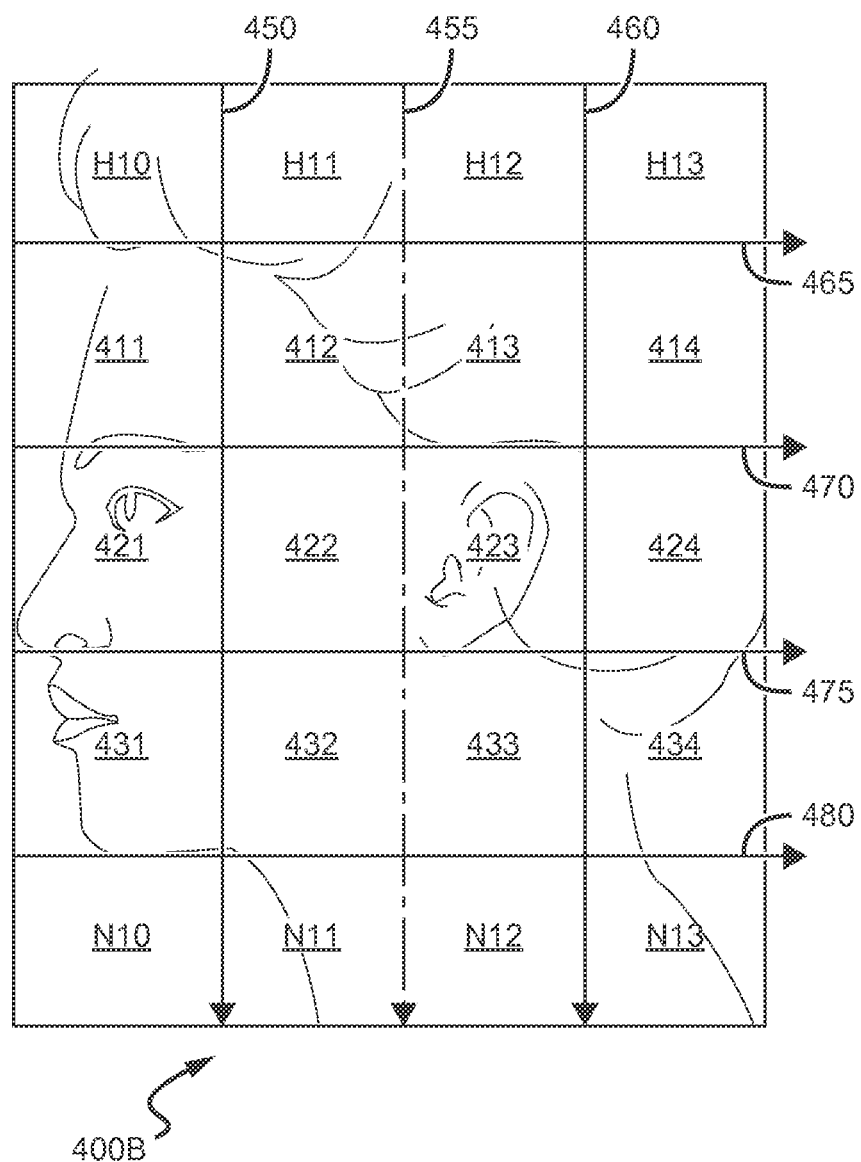

FIGS. 4A-4B illustrate a grid applied to a female face in frontal and profile views. Gridded image 400A includes grid lines 410A, 420A, 430A and 440A, which divide a representation of the female subject's face, hair and neck into five sections including section 410 (hair and forehead), section 420 (under the subject's brow-bone to under the subject's nostrils) and section 430 (beneath the subject's nostrils to the user's chin).

Gridded image 400B includes a profile image of the female subject's face, and includes grid lines 450, 455 and 460 extending vertically, and lines 465, 470, 475 and 480 aligning with grid lines 410A, 420A, 430A and 440A, respectively. The grid could be applied in any suitable manner in accordance with any suitable anchoring points and/or formulas including, for example, the anchoring points described in connection with FIG. 3B.

As illustrated, gridded image 400B includes: Grid sections H10, H11, H12 and H13 associated with the subject's hair; grid sections 411, 412, 413 and 414 associated with the subject's forehead, temple and hair; grid sections 421, 422, 423 and 424 associated with the subject's eyes, nose, cheek, ear and hair; grid sections 431, 432, 433 and 434 associated with the subject's mouth, chin, jaw and neck; and grid sections N10, N11, N12 and N13 associated with the subject's neck.

Figure 5:
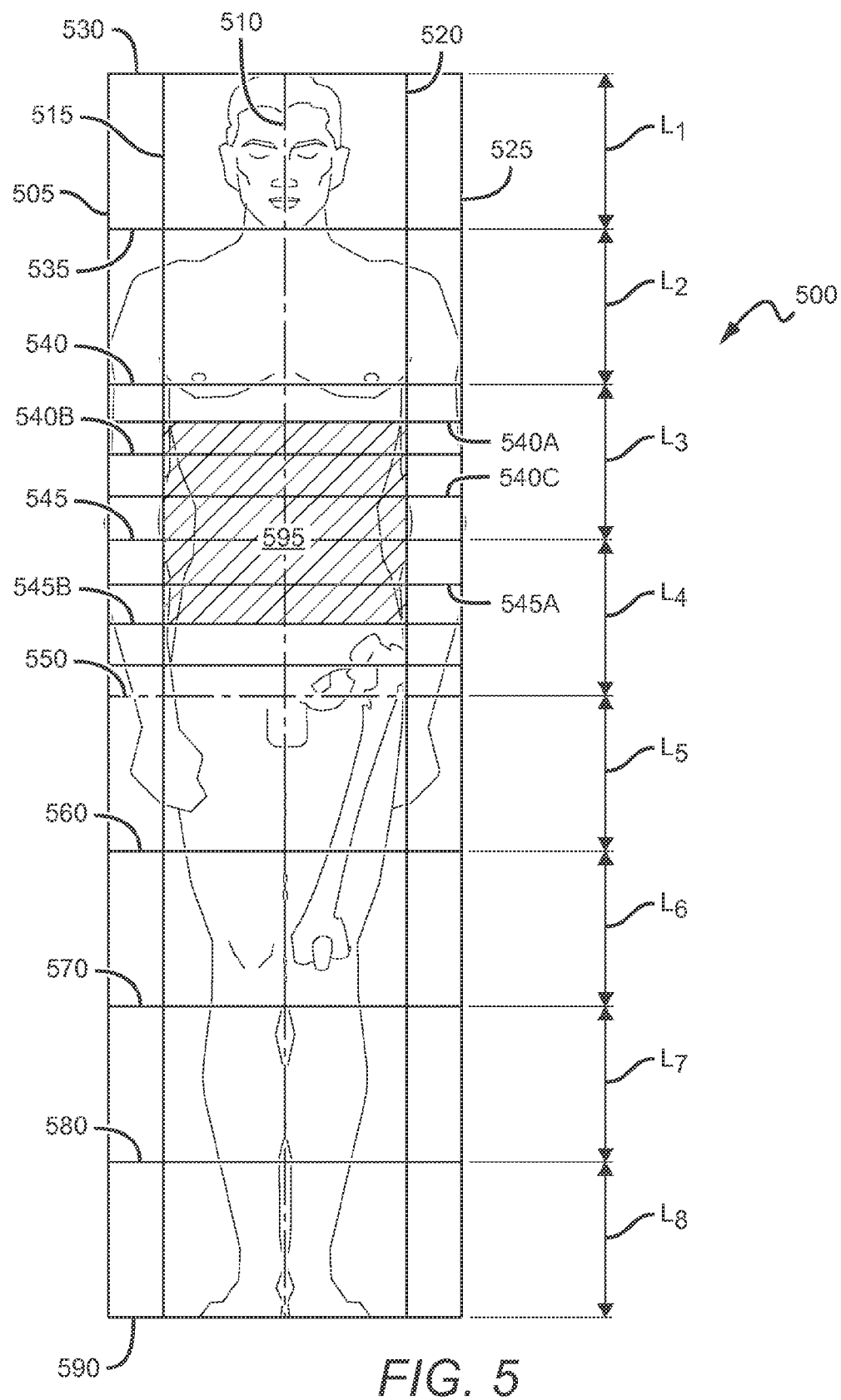
FIG. 5 illustrates a gridded image of a representation of a male face and body.

FIG. 5 illustrates a gridded image including a representation of a male face and body. The grid applied to the male subject's representation includes a midline 510, two axillary lines 515 and 520, a top horizontal line 530, a bottom horizontal line 590, right side body vertical line 505, left side body vertical line 525, and various other grid lines discussed further herein.

Where the user is utilizing a computer application embodying components of the inventive subject matter, it is contemplated that the user can utilize a user interface to select and/or capture an image and cause a gridded image to be generated and analyzed in a manner similar to what was described above in connection with the figures above.

For example, the user can capture, upload or select a front view full body image of a subject. A user could then place a grid on the photo lining up with specified anchoring points, and can increase or decrease the grid size (e.g., diagonally, horizontally, vertically, etc.) to obtain proper alignment and/or sizing.

While any suitable anchoring points are contemplated, the following are some examples of anchoring points that could be utilized: Line 535 could be aligned with the bottom of the user's chin; midline 510 could be aligned with the center of the subject's nose or mouth; axillary lines 515 and 520 could be aligned with the subject's armpits; and/or waist line 545B (the line in between lines 545 and 550 forming L4) could align with the subject's waist.

Based on the placement of one or more lines in accordance with an anchoring point or formula, the remaining grid lines could be generated, moved, resized and/or modified. As shown, grid lines 530 and 535 form L1, a first head length extending from the top of the subject's head to the bottom of the subject's chin. Lines 535 and 540 form L2, a second head length extending from the bottom of the subject's chin to just under the subject's armpit. Lines 540 and 545 form L3, a third head length extending from just under the subject's armpit to the subject's navel area. Lines 545 and 550 form L4, a fourth head length extending from under the navel area to the subject's groin area. Lines 550 and 560 form L5, a fifth head length extending from the subject's groin to the subject's finger tips (where fingers are placed straight down). Lines 560 and 570 form L6, a sixth head length extending from the finger tips to just under the subject's knees. Lines 570 and 580 form L7, a seventh head length extending from under the subject's knees to under the subject's calves muscles. Lines 580 and 590 form L8, an eighth head length extending from under the subject's calves muscles and to the bottom of the subject's feet. In other embodiments, some of all of the grid sections could comprise different lengths.

One or more feature grid portions can be generated based on pixel data associated with some or all of the gridded image. For example, abdomen feature grid portion 595 comprises the lower ¾ subsections of the grid sections aligning with L3 between axillary lines 515 and 520 (e.g., the subsections extending vertically from line 540A, through lines 540B and 540C, and to line 545), as well as the upper ½ subsection of the grid sections aligning with L4 between axillary lines 515 and 520 (e.g., the subsections extending vertically from line 545 through line 545A and to line 545B).

An analysis platform could be configured to provide an analysis, an attractiveness score, a recommendation and/or a modified or new image similarly to those that were discussed in connection with facial images above.

Figure 6:
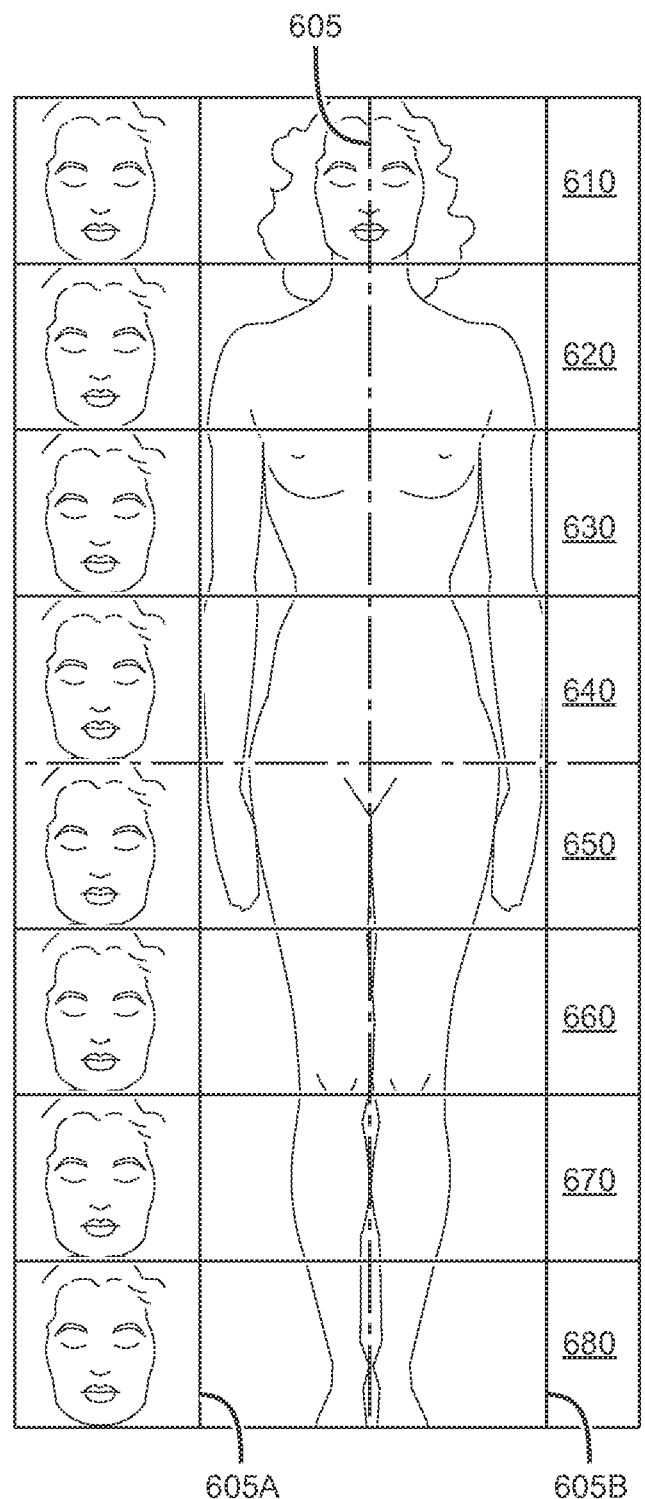
FIG. 6 illustrates a gridded image of a representation of a female face and body.

FIG. 6 illustrates a gridded image including a representation of a female face and body. The gridded image similarly includes eight head lengths 610, 620, 630, 640, 650, 660, 670 and 680, and is based at least in part on an anchoring formula that places the image of the entire female subject between grid lines 605A ad 605B, with midline 605 aligning with the center of the subject's nose.

An analysis platform could be configured to analyze the female gridded image similarly to the image of FIG. 5. However, the lengths of the various grid sections may extend across different portions of the female's body (relative to the male body) due to differences in proportions and shapes. For example, length 620 could extend to the bottom of the subject's armpit and/or nipple line (depending on the female's breast size, etc.). As another example, while the male image grid has a width of about 2.3 times the width of the subject's head from lines 505 to 525, the female image grid may have a width of closer to 1.5-2 times the width of the female subject's head.

While the embodiments illustrated herein are generally directed towards an analysis of images including only a single subject, it should be appreciated that systems and methods of the inventive subject matter could be used to analyze images including multiple subjects, for example, to provide or notify a user of attractiveness scores, recommendations and/or modified images relating to multiple subjects.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Also, as used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided herein is prior art or relevant to the presently claimed invention, or that any publication specifically or implicitly referenced is prior art.

Thus, specific systems and methods of providing recommendations and improving images have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A system for providing a recommendation to a person relating to a measure of attractiveness, comprising:
   an electronic analysis platform functionally coupled to a sensor that is configured to capture an image of a face of a subject; and
   wherein the analysis platform is configured to:
      obtain the image;
      apply a grid having a first grid section and a second grid section to the image of the face;
      identify a first feature on a first portion of the face corresponding to the first grid section;
      identify a second feature on a second portion of the face corresponding to the second grid section;
      compare pixel data of the first grid section with pixel data of the second grid section to determine a proportionality of a volume of the first feature relative to a volume of the second feature; and
      provide a recommendation to the person based at least in part on the step of comparing.

2. The system of claim 1, further comprising a device display, wherein the analysis platform is further configured to provide the recommendation via the device display.

3. The system of claim 1, wherein the image is further of a background environment, and at least one other body portion of the subject, and wherein the analysis platform is configured to apply the grid to portions of the image including the face, the background environment and the at least one other body portion.

4. The system of claim 1, wherein the grid comprises substantially vertical and substantially horizontal lines.

5. The system of claim 1, wherein the image of the face is a grayscale image, and wherein the pixel data of the first grid section comprises pixel intensity data.

6. The system of claim 1, wherein the image of the face comprises a gradient image, and wherein the pixel data of the first grid section comprises image gradient data.

7. The system of claim 1, wherein the first feature comprises at least one of at least a portion a nostril, at least a portion a cheek, at least a portion of a jaw, at least a portion an eye, at least a portion of a forehead, at least a portion a brow-bone, a temple, at least a portion of a bridge of a nose, at least a portion of a lip, at least a portion of a perimeter of the face, and at least a portion of an ear.

8. The system of claim 1, wherein the recommendation is related to a product.

9. The system of claim 1, wherein the recommendation is related to a procedure.

10. The system of claim 1, wherein the recommendation is related to at least one of a style and an accessory.

11. The system of claim 1, wherein the analysis platform is further configured to generate an attractiveness score based at least in part on the step of comparing.

12. The system of claim 11, wherein the analysis platform is further configured to modify the image to correspond to a higher attractiveness score.

13. A system for improving an image, comprising:
   an electronic analysis platform functionally coupled to a database and a sensor;
   wherein the sensor is configured to capture an image of at least a portion of a subject;
   wherein the database is configured to store attractiveness scores corresponding to at least one of grid section image data, grid section curvature data and grid section volume data; and
   wherein the analysis platform is configured to:
      obtain the image;
      apply at least a first grid section to the image around a first feature of the subject;
      obtain a first set of image data related to the at least the first grid section to determine a first curvature of the first feature;
      determine a first volume of the first feature based at least in part on the first set of image data;
      apply at least a second grid section to the image around a second feature of the subject;
      obtain a second set of image data related to the at least the second grid section to determine a second curvature of the second feature;
      determine a second volume of the second feature based at least in part on the second set of image data;
      generate an attractiveness score based at least in part on the first and second curvatures and the first and second volumes and a query of the database; and
      modify the image to correspond to a higher attractiveness score.

14. The system of claim 13, wherein the database further stores demographic data that correlates at least some of the stored attractiveness scores, and wherein the demographic data is associated with at least one of an age, an income level, a nationality, an ethnicity and a gender.

15. The system of claim 13, wherein the analysis platform is further configured to provide a recommendation for at least one of a product and a service based at least in part on the attractiveness score generated by the analysis platform.

16. The system of claim 13, wherein the analysis platform is further configured to convert the image into a grayscale image prior to obtaining the first set of image data related to the at least the first grid section, and wherein the image data comprises pixel data.

17. The system of claim 13, wherein the first feature is different from the second feature, and wherein the analysis platform is further configured to (a) compare the first volume with the second volume to determine a first ratio value, and (b) generate the attractiveness score based at least in part on the first ratio value.

18. The system of claim 13, wherein the analysis platform is further configured to identify at least one of a mid-point and a midline of the face prior to applying the grid to the face.

19. The system of claim 13, wherein the analysis platform is further configured to apply the grid to the face based at least in part on a predetermined anchoring formula.

20. The system of claim 13, wherein the analysis platform is further configured to measure the first volume by determining an extent to which the first feature appears on the at least the first grid section based at least in part on the first set of pixel data.

* * * * *